United States Patent
Yang et al.

(10) Patent No.: US 12,221,331 B2
(45) Date of Patent: Feb. 11, 2025

(54) METHOD FOR FORKLIFT PICKUP, COMPUTER DEVICE, AND NON-VOLATILE STORAGE MEDIUM

(71) Applicant: VisionNav Robotics (Shenzhen) Co., Ltd., Guangdong (CN)

(72) Inventors: Bingchuan Yang, Guangdong (CN); Yujie Lu, Guangdong (CN); Lisha Huang, Guangdong (CN); Mu Fang, Guangdong (CN)

(73) Assignee: VisionNav Robotics (Shenzhen) Co., Ltd., Shenzhen (CN)

( * ) Notice: Subject to any disclaimer, the term of this patent is extended or adjusted under 35 U.S.C. 154(b) by 103 days.

(21) Appl. No.: 17/870,107

(22) Filed: Jul. 21, 2022

(65) Prior Publication Data

US 2023/0192462 A1    Jun. 22, 2023

(30) Foreign Application Priority Data

Dec. 21, 2021  (CN) .......................... 202111573223.3

(51) Int. Cl.
| | | |
|---|---|---|
| B66F 9/00 | (2006.01) | |
| B66F 9/06 | (2006.01) | |
| B66F 9/075 | (2006.01) | |
| G06T 1/00 | (2006.01) | |
| G06T 7/00 | (2017.01) | |
| G06T 7/70 | (2017.01) | |
| G06V 10/762 | (2022.01) | |
| G06V 10/80 | (2022.01) | |

(52) U.S. Cl.
CPC ............ B66F 9/0755 (2013.01); B66F 9/063 (2013.01); G06T 1/0014 (2013.01); G06T 7/70 (2017.01); G06V 10/762 (2022.01); G06V 10/803 (2022.01); G06T 2207/10028 (2013.01)

(58) Field of Classification Search
CPC .......... B66F 9/0755; B66F 9/063; G06T 7/70; G06T 1/0014; G06T 2207/10028; G06V 10/762; G06V 10/803
USPC ......................................................... 701/50
See application file for complete search history.

(56) References Cited

U.S. PATENT DOCUMENTS

| 9,898,833 B1* | 2/2018 | Jankevics ................. G06T 7/62 |
| 2017/0096301 A1 | 4/2017 | Hartmann et al. |
| 2020/0174473 A1* | 6/2020 | Moriya ................ G05D 1/0297 |
| 2021/0309460 A1* | 10/2021 | Kim ...................... G05D 1/0246 |

FOREIGN PATENT DOCUMENTS

| CN | 108062766 A | 5/2018 |
| CN | 110889828 A | 3/2020 |
| JP | 2020064335 A | 4/2020 |
| JP | 2021066576 A | 4/2021 |
| JP | 2021160860 A | 10/2021 |
| JP | 2021160931 A | 10/2021 |
| KR | 20190058230 A | 5/2019 |
| KR | 20210124977 A | 10/2021 |

OTHER PUBLICATIONS

Molter, Benjamin et al., "Real-time Pallet Localization with 3D Camera Technology for Forklifts in Logistic Environments," 2018 IEEE International Conference on Service Operations and Logistics, and Informatics (SOLI), Jul. 31, 2018, pp. 297-302.
EPO, Extended European Search Report issued in corresponding European Patent Application No. 22186363.2, Dec. 16, 2022, 9 pages.
European Patent Office, Office Action Issued in Application No. 22186363.2, Jun. 7, 2024, Germany, 6 pages.
Korean Intellectual Property Office, Office Action Issued in Application No. 10-2022-0111368, Jun. 3, 2024, 16 pages. (Submitted with Machine Translation).
JP2022142720—Notice of Reasons for Refusal mailed on Nov. 2, 2023, 10 pages.

* cited by examiner

*Primary Examiner* — Mahmoud S Ismail
(74) *Attorney, Agent, or Firm* — Getech Law LLC; Jun Ye

(57) ABSTRACT

A method and apparatus for forklift pickup, a computer device, and a storage medium are provided in the disclosure. The method includes the following. Observational data of a truck parking area is obtained by observing the truck parking area. Point cloud data of at least one truck is obtained in the observational data, and point cloud data of each of the at least one carrier is obtained in the point cloud data of the at least one truck. A relative pose of each of at least one carrier is determined based on the point cloud data of each of the at least one carrier. A pickup priority is determined based on the point cloud data of each of the at least one carrier. A forklift is controlled to perform pickup according to the relative pose of each of the at least one carrier and the pickup priority.

20 Claims, 7 Drawing Sheets

METHOD FOR FORKLIFT PICKUP, COMPUTER DEVICE, AND NON-VOLATILE STORAGE MEDIUM

CROSS-REFERENCE TO RELATED APPLICATIONS

This application claims priority under 35 U.S.C. § 119(a) to Chinese Patent Application No. 202111573223.3 filed on Dec. 21, 2021, the entire disclosure of which is incorporated herein by reference.

TECHNICAL FIELD

This disclosure relates to the field of cargo handling technology, and in particular, to a method for forklift pickup, a computer device, and a storage medium.

BACKGROUND

With development of cargo handling technology, conventional manual forklift handling consumes too much labor cost, appearance of unmanned forklifts saves enterprise labor cost and improves efficiency of cargo handling. At present, when unmanned forklifts are used to unload cargoes, it is required to constrain truck parking locations and fix positioning poses and positioning orders of the cargoes, to decrease unloading requirements of the unmanned forklifts, such that pickup efficiency is low.

SUMMARY

In a first aspect, a method for forklift pickup is provided in the disclosure. The method includes the following. Observational data of a truck parking area is obtained by observing the truck parking area, where at least one truck is parked in the truck parking area, and each of the at least one truck is configured with at least one carrier. Point cloud data of the at least one truck is obtained in the observational data, and point cloud data of each of the at least one carrier is obtained in the point cloud data of the at least one truck. A relative pose of each of the at least one carrier is determined based on the point cloud data of each of the at least one carrier. A pickup priority is determined based on the point cloud data of each of the at least one carrier. A forklift is controlled to perform pickup according to the relative pose of each of the at least one carrier and the pickup priority.

In a second aspect, a computer device is further provided in the disclosure. The computer device includes a processor and a memory. The memory is configured to store computer programs, where the processor is configured to execute the computer programs to implement the following. Observational data of a truck parking area is obtained by observing the truck parking area, where at least one truck is parked in the truck parking area, and each of the at least one truck is configured with at least one carrier. Point cloud data of the at least one truck is obtained in the observational data, and point cloud data of each of the at least one carrier is obtained in the point cloud data of the at least one truck. A relative pose of each of the at least one carrier is determined based on the point cloud data of each of the at least one carrier. A pickup priority is determined based on the point cloud data of each of the at least one carrier. A forklift is controlled to perform pickup according to the relative pose of each of the at least one carrier and the pickup priority.

In a third aspect, a non-volatile computer-readable storage medium is further provided in the disclosure. The computer-readable storage medium is configured to store computer programs which, when executed by a processor, enable the processor to: obtain observational data of a truck parking area by observing the truck parking area, where at least one truck is parked in the truck parking area, and each of the at least one truck is configured with at least one carrier; obtain point cloud data of the at least one truck in the observational data, and obtain point cloud data of each of the at least one carrier in the point cloud data of the at least one truck; determine a relative pose of each of the at least one carrier based on the point cloud data of each of the at least one carrier; determine a pickup priority based on the point cloud data of each of the at least one carrier; and control a forklift to perform pickup according to the relative pose of each of the at least one carrier and the pickup priority.

DETAILED DESCRIPTION

In order to make the purposes, technical solutions, and advantages of the disclosure clearer, the following will describe the disclosure in detail with a combination of accompanying drawings and implementations. It should be understood that, specific implementations described herein are merely for explaining, rather than limiting, the disclosure.

Figure 1:
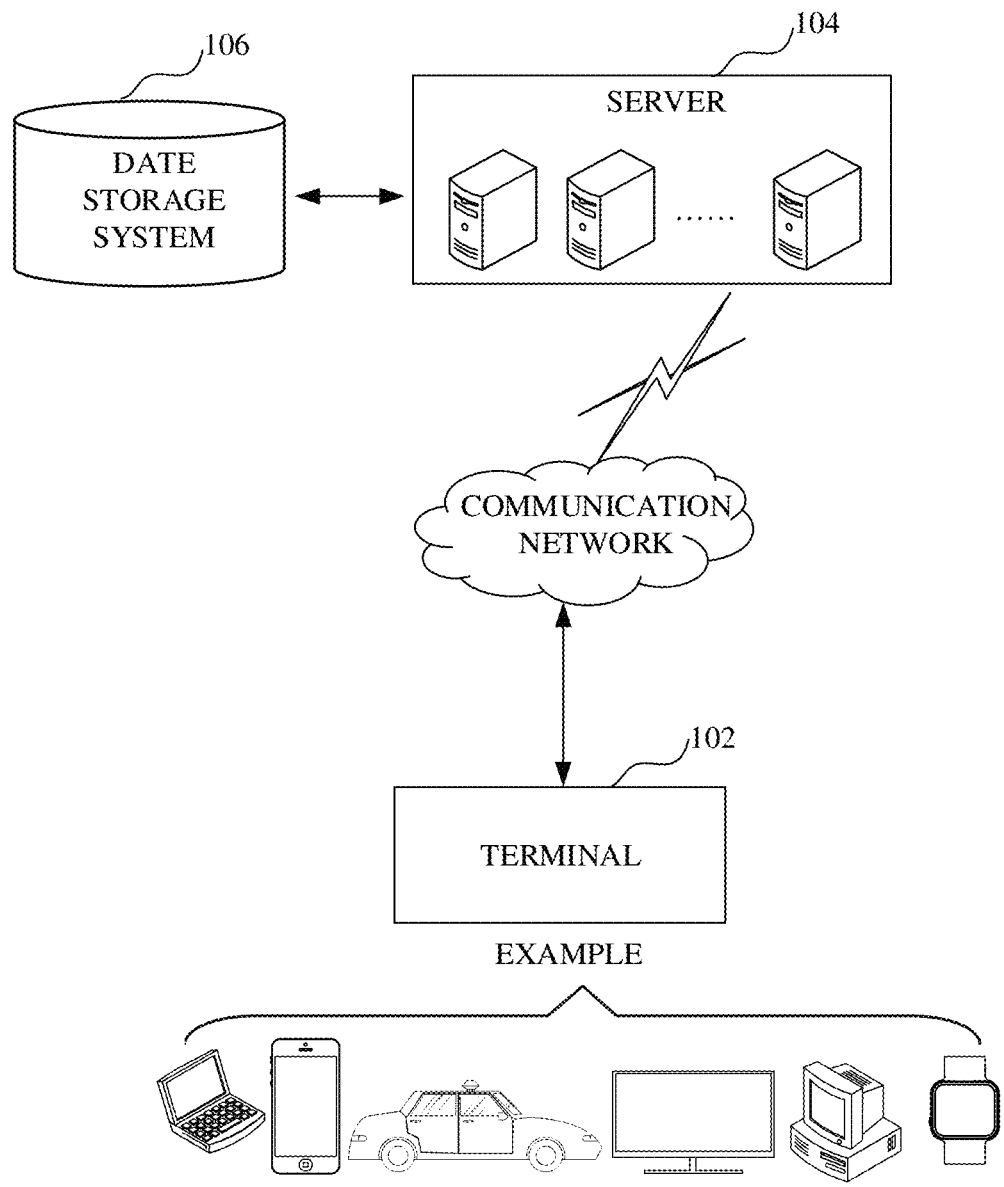
FIG. 1 is a diagram illustrating an environment where a method for forklift pickup in an implementation is applied.

A method for forklift pickup provided in the disclosure can be applied to an environment illustrated in FIG. 1. A terminal 102 communicates with a server 104 via a network. A data storage system 106 can store data to be processed by the server 104. The data storage system 106 can be integrated onto the server 104, and can also be placed on a cloud or other network servers. When the data storage system 106 is integrated onto the server 104, the data storage system 106 can communicate with the server 104 via a bus in the server 104. Alternatively, when the data storage system 106 is placed on a cloud or other network servers, the data storage system 106 communicates with the server 104 through the network. The server 104 obtains observational data of a truck parking area collected by the terminal 102, where at least one truck is parked in the truck parking area, and each of the at least one truck is configured with at least one carrier. The server 104 obtains point cloud data of the at least one truck in the observational data, and obtains point cloud data of each of the at least one carrier in the point cloud data of the at least one truck. The server 104 determines a relative pose of each of the at least one carrier based on the point cloud data of each of the at least one carrier. The server 104 determines a pickup priority based on the point cloud data of each of the at least one carrier. The server 104 controls a forklift to perform pickup according to the relative pose of each of the at least one carrier and the pickup priority. The terminal 102 may be but is not limited to various personal computers, notebook computers, smart phones, tablet computers, Internet of things (IoV) devices, or portable wearable devices. The IoV devices may be smart speakers, smart televisions (TVs), smart air conditioners, smart in-vehicle devices, etc. The portable wearable devices may be smart watches, smart bracelets, headsets, etc. The server 104 may be implemented by a separate server or a server cluster composed of multiple servers. In implementations of the disclosure, the server 104 may be a central control system. The data storage system 106 may include at least one of a non-volatile memory or a volatile memory.

Figure 2:
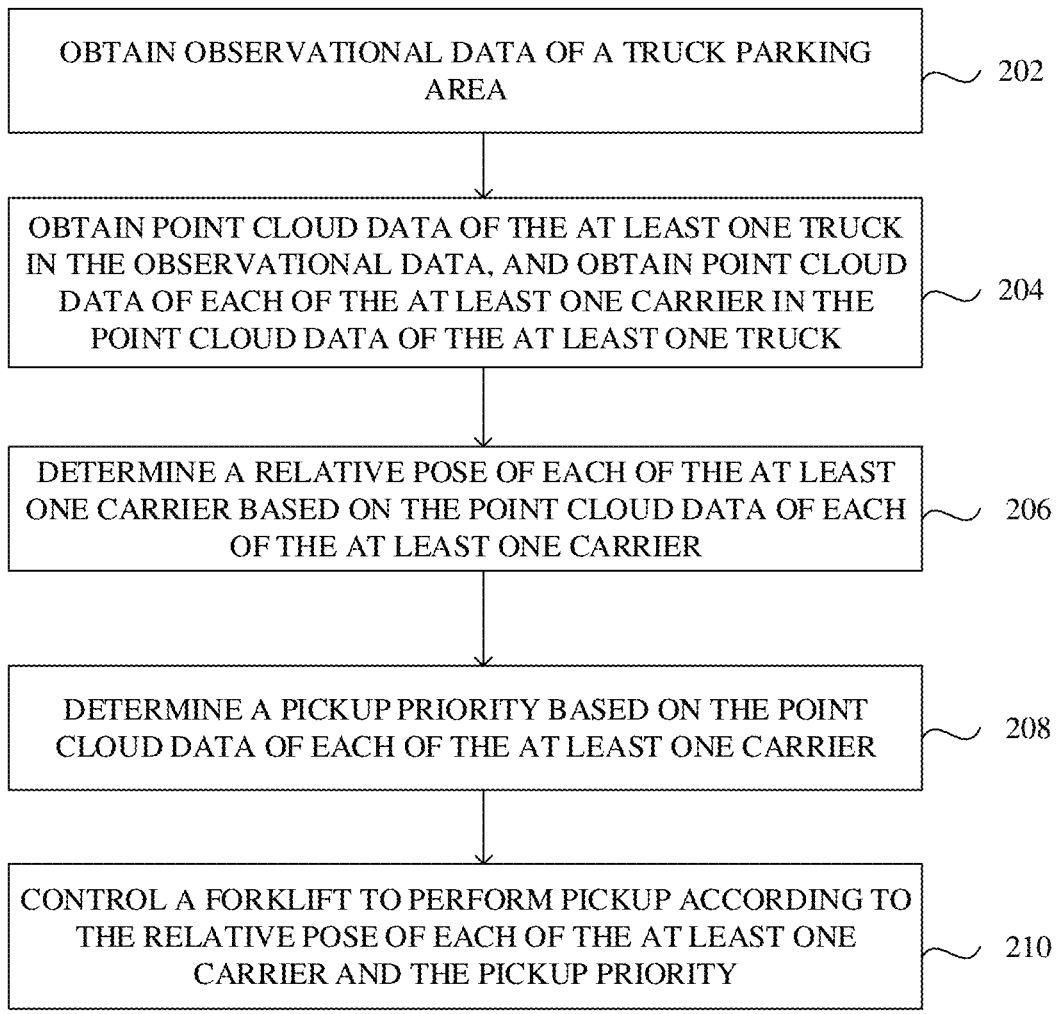
FIG. 2 is a schematic flow chart illustrating a method for forklift pickup in an implementation.

In an implementation, as illustrated in FIG. 2, a method for forklift pickup is provided. The method applied to the server 104 illustrated in FIG. 1 is taken as an example for illustration. The method includes the following operations.

At 202, observational data of a truck parking area is obtained.

At least one truck is parked in the truck parking area, and each of the at least one truck is configured with at least one carrier. The observational data refers to data obtained by observing a truck loaded with goods in the truck parking area.

Specifically, the truck parking area is preset first, and monitoring devices are deployed around the truck parking area. After at least one truck is parked in the truck parking area, a central control system, which specifically can be a processor of the central control system, controls the monitoring devices to observe the truck parking area, to obtain the observational data of the truck parking area.

At 204, point cloud data of the at least one truck is obtained in the observational data, and point cloud data of each of the at least one carrier is obtained in the point cloud data of the at least one truck.

In the observational data, a spatial area of the truck loaded with goods is determined, and then the point cloud data of the at least one truck is obtained. Point cloud data refers to a set of a group of vectors in a three-dimensional (3D) coordinate system and is recorded in a form of point, where each point contains a 3D coordinate, and some points may also contain color information, reflection intensity information, or the like. The color information refers to spatial color information. The reflection intensity information refers to information of different intensities obtained from reflection of lasers scanning to different planes in a collecting procedure. The processor obtains the point cloud data of the at least one truck by processing the observational data. The carrier refers to a supporting body configured with a loading space and an opening and is used to carry goods of trucks. The carrier specifically may include a material cage, or the like. The carrier includes a supporting foot, e.g., a foot pier, etc.

Specifically, based on the truck parking area, the processor obtains point cloud data collected by monitoring points at two sides of the truck parking area in the observational data. The processor projects in a y-axis direction the point cloud data collected by the monitoring points at the two sides of the truck parking area onto a plane parallel to an x-z plane, to form a two-dimensional (2D) plane. The processor then obtains the point cloud data of each of the at least one carrier by performing carrier recognition on the 2D plane with a target detection algorithm. The target detection algorithm is an algorithm with which a target object in an image or a video can be found out and a location and size of the target object can be detected, and the target detection algorithm is mainly used to detect point cloud data of a carrier. An algorithm for detecting point cloud data of a carrier is not limited to the target detection algorithm but can also include other algorithms that are able to detect point cloud data of a carrier. The truck parking area is a rectangular area, a direction of a long edge of the truck parking area is assigned as an x-axis direction, a direction of a short edge of the truck parking area is assigned as the y-axis direction, and a direction perpendicular to an xy plane is assigned as a z-axis direction.

At 206, a relative pose of each of the at least one carrier is determined based on the point cloud data of each of the at least one carrier.

A pose is a relative concept, which is relative to a common coordinate system defined by a world coordinate system and an euler angle coordinate system. An establishment manner of the world coordinate system is to assign a direction of a long edge of truck parking area P as the x-axis direction, a direction of a short edge of the truck parking area P as the y-axis direction, and a direction perpendicular to an xy plane as the z-axis direction. Euler angles are a set of three independent angles used to determine uniquely orientation of a rigid body with respect to a fixed point, which consist of nutation angle $\theta$, precession angle $\psi$, self-rotation angle $\varphi$.

Specifically, the processor determines the relative pose of each of the at least one carrier based on the point cloud data of each of the at least one carrier.

At 208, a pickup priority is determined based on the point cloud data of each of the at least one carrier.

The pickup priority refers to an order in which goods are picked up. A pickup order is determined by determining a priority for the point cloud data of each of the at least one carrier.

Specifically, the processor obtains a gap between two adjacent carriers based on the point cloud data of each of the at least one carrier, and determines the pickup priority according to the gap between the two adjacent carriers.

At 210, a forklift is controlled to perform pickup according to the relative pose of each of the at least one carrier and the pickup priority.

Specifically, after obtaining the relative pose of each of the at least one carrier and the pickup priority, the processor controls a fork inserting direction of the forklift according to the relative pose of each of the at least one carrier, and controls the forklift to perform pickup on goods carried by a corresponding carrier according to the pickup priority.

In the above method for forklift pickup, the observational data of the truck parking area is obtained by observing the truck parking area. The point cloud data of the at least one truck is obtained in the observational data, and the point cloud data of each of the at least one carrier is obtained in the point cloud data of the at least one truck. The relative pose of each of the at least one carrier is determined based on the point cloud data of each of the at least one carrier. The pickup priority is determined based on the point cloud data of each of the at least one carrier. The forklift is controlled to perform pickup according to the relative pose of each of the at least one carrier and the pickup priority. As such, the forklift can be automatically controlled to perform pickup, pickup efficiency can be improved, and a problem that the forklift is difficult to perform pickup in a complex environment can be solved.

In an implementation, the observational data of the truck parking area is obtained by observing the truck parking area as follows. Candidate data of at least one truck in the truck parking area collected by each of multiple monitoring devices is obtained. The observational data is obtained by fusing the candidate data collected by each of the multiple monitoring devices.

The multiple monitoring devices set at the monitoring points may include 3D laser sensors and cameras, which are not limited herein. The 3D scenarios are reconstructed by the 3D laser sensors through triangulation. The candidate data of the at least one truck in the truck parking area is obtained by matching laser sources with the cameras. The candidate data includes candidate point cloud data and candidate image data of the at least one truck in the truck parking area, and candidate point cloud data and candidate image data of goods on the at least one truck in the truck parking area. Complete 3D point cloud data with a color characteristic in a real world is obtained by fusing the data collected by a 3D laser sensor and a camera at each of the monitoring points. Furthermore, the observational data of the truck parking area is obtained by fusing complete 3D point cloud data corresponding to the 3D laser sensors and the cameras at the multiple monitoring points. Specifically, image data fusion is to connect multiple images into one big picture. Point cloud data fusion includes consistency processing of three aspects of space-time benchmark and accuracy, scale, and semantics. Consistency processing of space-time benchmark and accuracy is to realize consistency between space-time benchmark and accuracy and build a scenario-unified point cloud model according to complex relations and interconversion laws between different data sources. A processing method for scale consistency is to eliminate point cloud data of an overlapping part of multiple point cloud data with different point cloud densities and detail resolutions. A processing method for semantics consistency is to realize consistency of multi-point cloud data in an understanding level through unified semantic identifiers.

Specifically, 3D laser sensors and cameras at preset monitoring points collecting the observational data are taken as an example. The processor obtains candidate point cloud data and candidate image data of at least one truck in the truck parking area collected by a 3D laser sensor and a camera at each of the preset monitoring points. Complete 3D point cloud data with a color characteristic in a real world is obtained by fusing the data collected by the 3D laser sensor and the camera at each monitoring point. Specifically, the observational data is obtained by fusing the data according to a coordinate (xi, yi, zi) in the world coordinate system and a corresponding euler angle (pitchi, rolli, yawi) of the 3D laser sensor at each monitoring point. An establishment manner for the world coordinate system is to assign a direction of a long edge of truck parking area P as the x-axis direction, a direction of a short edge of the truck parking area P as the y-axis direction, and a direction perpendicular to an xy plane as the z-axis direction. Euler angles are a set of three independent angles used to determine uniquely orientation of a rigid body with respect to a fixed point, which consist of nutation angle θ, precession angle ψ, self-rotation angle φ.

In the implementation, complete point cloud data of the truck parking area can be obtained by fusing point cloud data collected by the multiple monitoring devices.

In an implementation, the truck parking area is a rectangular area, monitoring points are set at two sides of long edges of the rectangular area, monitoring devices are deployed at the monitoring points, and there is an overlap between observation intervals corresponding to adjacent monitoring points. The number of the monitoring points are obtained according to a length of a long edge of the rectangular area and an effective observation distance of each of the monitoring points. The effective observation distance is determined according to an observation distance of a target monitoring device. The observation distance of the target monitoring device is determined according to a vertical distance between the target monitoring device and the long edge of the rectangular area and a field angle of the target monitoring device, where the target monitoring device is a monitoring device with a minimum field angle in all the monitoring devices. The monitoring devices may include 3D laser sensor and cameras.

Figure 3:
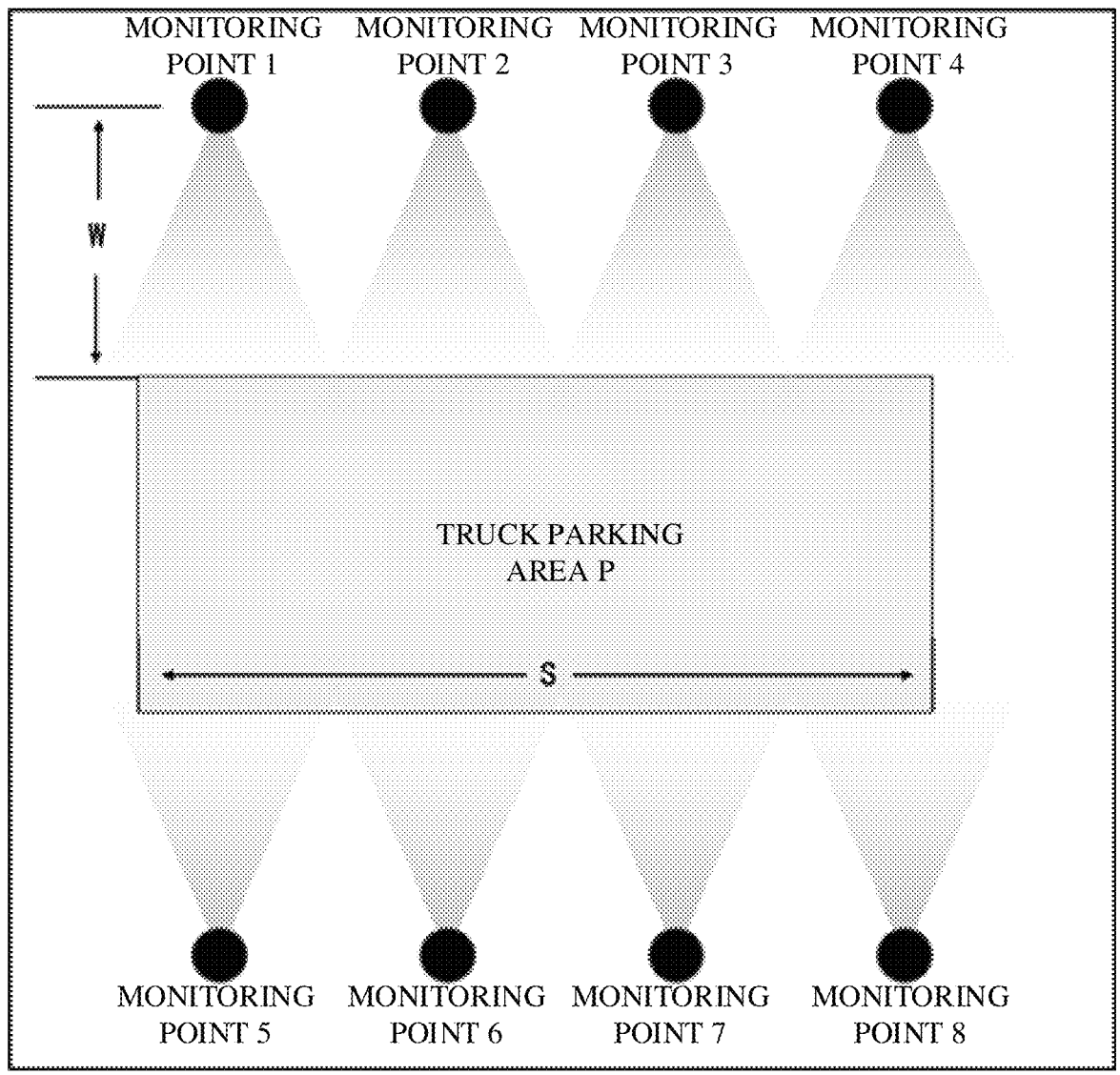
FIG. 3 is a schematic diagram illustrating deployment of locations of monitoring points in an implementation.

Specifically, as illustrated in FIG. 3, the truck parking area is P, P is a rectangular area, a long edge is of S meters, and monitoring points are set two sides of long edges of P. A straight line formed by monitoring points at an identical side is parallel to the long edge of P, and a distance between each of the monitoring points at the identical side and P is of w meters. The processor obtains a field angle θ of a sensor of a monitoring device at a monitoring point. If the monitoring device has multiple types of sensors, a minimum field angle is selected for calculation. A formula for calculating an observation distance of a single sensor is $$x = w \cdot \tan\left(\frac{\theta}{2}\right) \cdot \frac{1}{2},$$

where x represents an observation distance of a single sensor, θ represents a field angle of a sensor at a monitoring point, and w represents a distance between a monitoring point and a long edge of the truck parking area. In order to ensure accuracy of data obtained, observation fields between two adjacent monitoring points can be ensured with a certain overlap, in this case, a formula for calculating an effective observation distance of a monitoring point is x'=x·non overlapping ratio, where x' represents an effective observation distance of a monitoring point, and x represents an observation distance of a single sensor. A formula for calculating the number of monitoring points is $$n = 2 \cdot \frac{s}{x'},$$

where n represents the number of monitoring points, s represents a length of a long edge of the truck parking area, and x' represents an effective observation distance of a monitoring point.

In the implementation, the number of monitoring points is calculated according to a length of a long edge of the truck parking area and a field range of each of the monitoring point, the corresponding number of monitoring points are deployed, and corresponding monitoring devices are placed, such that more complete observational data can be obtained.

In an implementation, the relative pose of each of the at least one carrier is determined based on the point cloud data of each of the at least one carrier as follows. For each of the at least one carrier, a front-end cross-sectional point cloud cluster of the carrier is obtained by processing the point cloud data of the carrier. The front-end cross-sectional point cloud cluster of the carrier is sliced into sliced layers in a direction perpendicular to a z axis, and clustering is performed on point clouds of each of the sliced layers, where the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction. Clustering results are matched with supporting foot information of a carrier in a preset template, and a sliced layer not satisfying a matching requirement is eliminated, to obtain a pose of the carrier.

Figure 4:
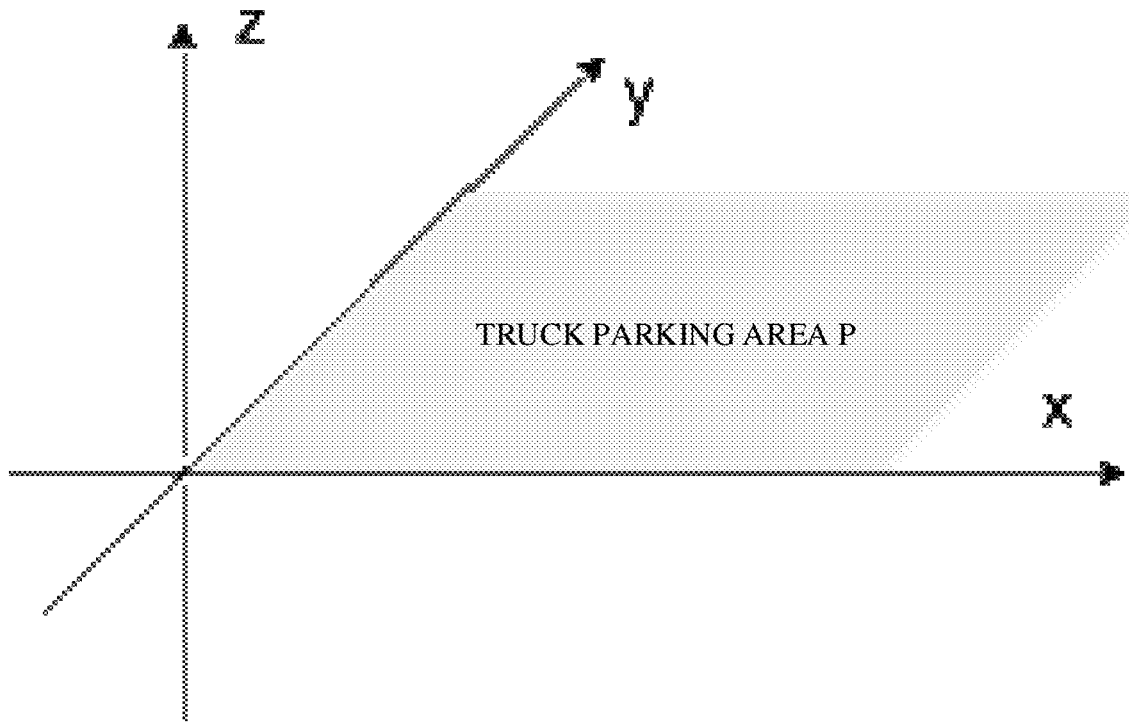
FIG. 4 is a schematic diagram illustrating establishment of coordinates based on a truck parking area in an implementation.
Figure 5:
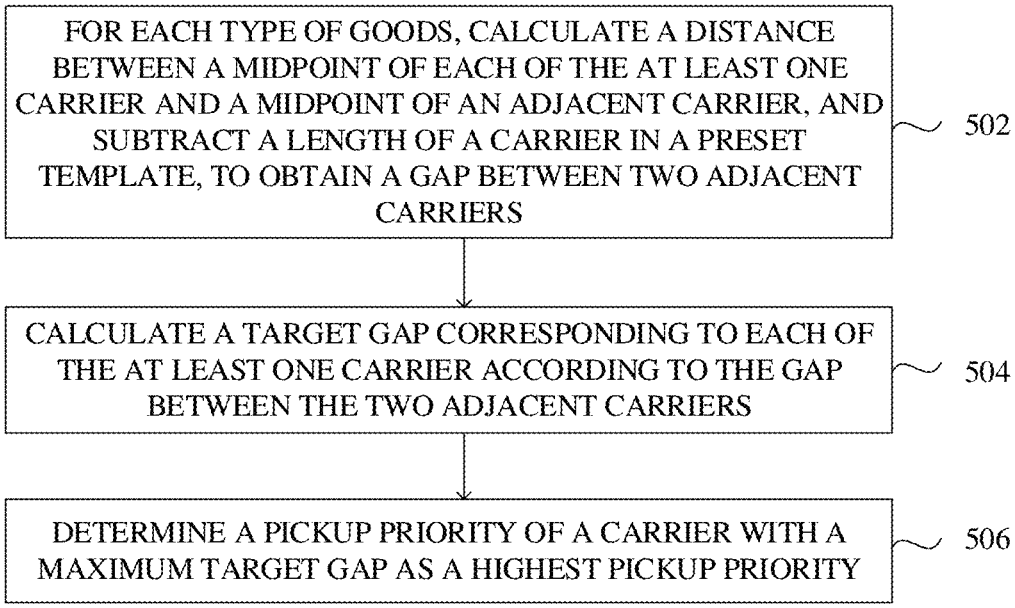
FIG. 5 is a schematic flow chart illustrating a method for forklift pickup in an implementation.

A coordinate system is established by using the truck parking area. As illustrated in FIG. 4, a direction of the long edge of the truck parking area P is assigned as an x-axis direction, a direction of the short edge of the truck parking area is assigned as a y-axis direction, and a direction perpendicular to the xy plane is assigned as a z-axis direction. The front-end cross-sectional point cloud cluster of the carrier is a cross section defined by a point cloud cluster of the carrier, where the point cloud cluster is closest to monitoring points at an identical side in a direction parallel to a plane defined by the x axis and the z axis. The monitoring points at the identical side are monitoring points at an identical side of the truck parking area. For example, as illustrated in FIG. 3, monitoring points 1 to 4 belong to monitoring points at an identical side, and monitoring points 5 to 8 belong to monitoring points at an identical side. Clustering is to divide a data set into different categories or clusters according to a certain specific standard (e.g., distance), such that a similarity among data objects in an identical cluster is as great as possible, and a difference among data objects in different identical clusters is also as great as possible. After clustering, data of an identical category is clustered together as much as possible, and data of different categories is separated as much as possible. Clustering analysis is performed on point cloud data of the sliced front-end cross-sectional point cloud cluster of the carrier. A supporting foot refers to a foot pier of the carrier. According to sizes and the number of foot piers and different distances between foot piers, information of widths of foot piers and information of distances between foot piers of each type of carriers (e.g., a material cage) are obtained and input into a template to be assigned as the supporting foot information. Specifically, the truck parking area is a rectangular area, a direction of the long edge of the truck parking area is assigned as an x-axis direction, a direction of the short edge of the truck parking area is assigned as a y-axis direction, and a direction perpendicular to the xy plane is assigned as a z-axis direction. The processor obtains the supporting foot information of the carrier in the preset template. The processor obtains the front-end cross-sectional point cloud cluster of the carrier by filtering the point cloud data of the carrier. The front-end cross-sectional point cloud cluster of the carrier is sliced into sliced layers in the direction perpendicular to the z axis, and clustering is performed on the point clouds of each of the sliced layers. After clustering, widths of foot piers and distances between foot piers of each type of material cages are calculated and then compared with the widths of foot piers and the distances between foot piers of each type of material cages in the template, sliced layers with an identical size and distance are maintained, and sliced layers with different sizes and distances are eliminated.

In the implementation, the pose of the carrier is obtained for providing a data support for a fork inserting direction.

In an implementation, the front-end cross-sectional point cloud cluster of the carrier is obtained by processing the point cloud data of the carrier as follows. The front-end cross-sectional point cloud cluster of the carrier is obtained by performing density filtering and normal vector filtering on the point cloud data of the carrier. The density filtering is to rank number of point clouds according to distances between the point clouds and a monitoring point at an identical side in the y-axis direction, and maintain point clouds within a peak interval range, where the peak interval range refers to a distance range containing a target distance from the monitoring point, a maximum number of point clouds are located at the target distance from the monitoring point. The normal vector filtering is to perform plane fitting on the point cloud data of the carrier, to obtain point cloud data satisfying a preset requirement.

The method for density filtering for point clouds is to rank the number of point clouds according to distances between the point clouds and a monitoring point at an identical side in the y-axis direction, and maintain point clouds within the peak interval range. Supposing that a maximum number of point clouds are located at y' meters from the monitoring point, a maintaining-area value a is set, and point clouds within an interval [y'−a, y'+a] are maintained, where [y'−a, y'+a] is the peak interval range. A direction of the long edge of the truck parking area P is assigned as an x-axis direction, a direction of the short edge of the truck parking area P is assigned as a y-axis direction, and a direction perpendicular to the xy plane is assigned as a z-axis direction. The normal vector filtering is to perform plane fitting on the point cloud data within the peak interval range of the carrier, calculate an included angle between a normal vector and the y axis, set an included-angle threshold, and filter point cloud data corresponding to a normal vector greater than the included-angle threshold, to obtain point cloud satisfying requirements.

Specifically, a direction of the long edge of the truck parking area P is assigned as an x-axis direction, a direction of the short edge of the truck parking area P is assigned as a y-axis direction, and a direction perpendicular to the xy plane is assigned as a z-axis direction. An included-angle threshold between a normal vector and the y axis is preset. The processor maintains the point cloud data within the peak interval range, calculates an included angle between a normal vector and the y axis, and obtains point cloud satisfying requirements according to a normal vector greater than the included-angle threshold.

In the implementation, accurate point cloud data can be obtained by performing the density filtering and the normal vector filtering on the point cloud data.

In an implementation, the pickup priority is determined based on the point cloud data of each of the at least one carrier as follows.

At 502, for each type of goods, a distance between a midpoint of each of the at least one carrier and a midpoint of an adjacent carrier is calculated, and a length of a carrier in a preset template is subtracted, to obtain a gap between two adjacent carriers.

Specifically, goods are classified according to a characteristic point. For each type of goods, the processor calculates a distance between a midpoint of each of the at least one carrier and a midpoint of an adjacent carrier, and subtracts a length of a carrier in a preset template, to obtain a gap between two adjacent carriers. The characteristic point refers to one of steps, columns, or the like of the truck, which is not limited herein, and the characteristic point may be any characteristic mark to distinguish goods.

At 504, a target gap corresponding to each of the at least one carrier is calculated according to the gap between the two adjacent carriers.

Specifically, in each type of goods, the processor calculates a target gap corresponding to each of the at least one carrier according to the gap between the two adjacent carriers. In an implementation, the target gap corresponding to each of the at least one carrier is a sum of a left gap of each of the at least one carrier and a right gap of each of the at least one carrier.

At 506, a pickup priority of a carrier with a maximum target gap is determined as a highest pickup priority.

Specifically, the processor ranks the target gap corresponding to each of the at least one carrier from large to small according to the calculated target gap corresponding to each of the at least one carrier, and determines a pickup priority of a carrier with a maximum target gap as a highest pickup priority.

In the implementation, a pickup priority is determined according to gaps between carriers, such that determination of the pickup priority is more reasonable.

Figure 6:
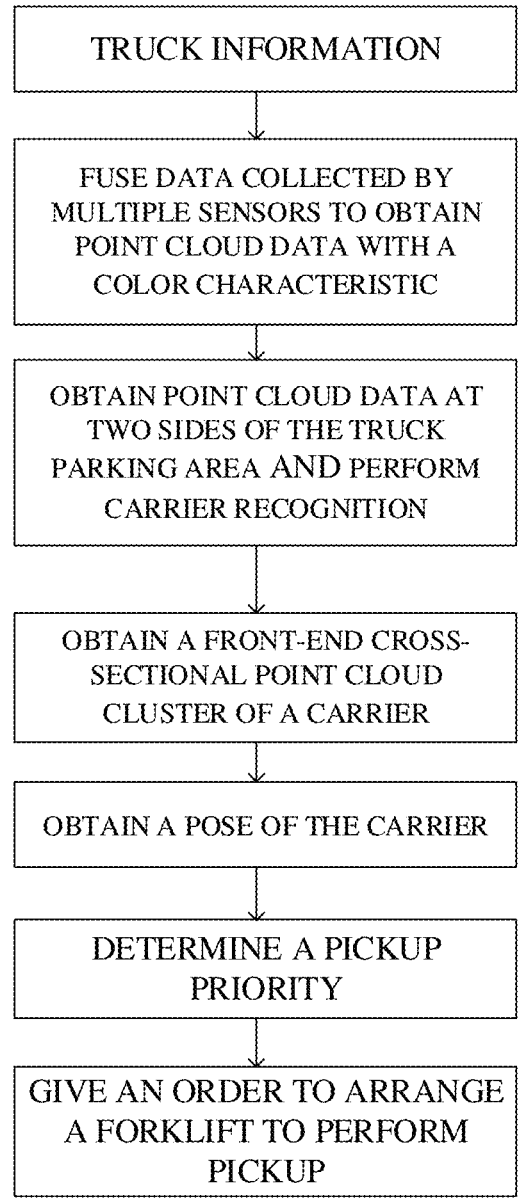
FIG. 6 is a schematic flow chart illustrating a method for forklift pickup in an implementation.

A detailed method for forklift pickup is provided in implementations of the disclosure. The truck parking area P is preset, eight monitoring points are deployed at the truck parking area P, and a 3D laser sensor and a camera are set at each of the eight monitoring points, to monitor the truck parking area P. A direction of the long edge of the truck parking area P is preset as an x-axis direction, a direction of the short edge of the truck parking area P is preset as a y-axis direction, and a direction perpendicular to the xy plane is preset as a z-axis direction. As illustrated in FIG. 6, specific operations for forklift pickup are the following.

(1) The central control system controls the 3D laser sensor and the camera at each of the eight monitoring points to collect observation information of the truck parking area P, i.e., to collect truck information.

(2) The central control system matches the 3D laser sensor and the camera, i.e., fuses data collected by multiple sensors to obtain point cloud data with a color characteristic. Furthermore, complete point cloud data of the truck parking area is obtained by fusing point cloud data with a color characteristic corresponding to at least one monitoring point, i.e., the complete point cloud data of the truck parking area is the observational data in the implementation.

(3) The central control system obtains point cloud data at two sides of the truck parking area in the complete point cloud data, and obtains point cloud data of a single carrier outline by performing carrier recognition on the point cloud data at two sides of the truck parking area with the target detection algorithm.

(4) After performing density filtering and the normal vector filtering on the point cloud data of the carrier outline, the central control system obtains the front-end cross-sectional point cloud cluster of the carrier according to a cross section defined by a point cloud cluster of the carrier, where the point cloud cluster is closest to monitoring points at an identical side in a direction parallel to a plane defined by the x axis and the z axis.

(5) The central control system slices in the direction perpendicular to the z axis the front-end cross-sectional point cloud cluster of the carrier into sliced layers, performs clustering on point clouds of each of the sliced layers, matches clustering results with supporting foot information of a carrier in a preset template, and eliminates a sliced layer not satisfying a matching requirement, to obtain a relative pose of the carrier.

(6) The central control system classifies goods on the truck, and for each type of goods, calculates a distance between a midpoint of each carrier and a midpoint of an adjacent carrier, and subtracts a length of the carrier in the preset template, to obtain a gap between two adjacent carriers. The central control system adds a left gap of each carrier and a right gap of each carrier, and ranks from large to small, such that a carrier with a maximum gap obtains a highest pickup priority.

(7) The central control system controlling the forklift to pick up the goods on the truck according to the relative pose of each of the carrier and the pickup priority.

It should be understood that although the various steps in the flowchart in various implementations mentioned above are shown in sequence according to the arrows, these steps are not necessarily executed in the sequence shown by the arrows. Unless explicitly stated herein, the execution of these steps is not strictly limited to the order, and the steps may be executed in other orders. Moreover, at least a part of the steps in various implementations mentioned above may include multiple steps or multiple stages, and these steps or stages are not necessarily executed at the same time, but may be executed at different times, and the execution sequence of these steps or stages is also It does not have to be performed sequentially, but may be performed alternately or alternately with other steps or at least a portion of the steps or stages within the other steps.

Based on a same inventive concept, an apparatus for forklift pickup configured to implement the above method for forklift pickup is further provided in implementations of the disclosure. Implementation solutions for solving problems provided by the apparatus are similar to the implementation solutions illustrated in the above method. For specific limitation in one or more implementations for the apparatus for forklift pickup provided in the following, reference can be made to the above limitation for the method for forklift pickup, which will not be repeated herein.

Figure 7:
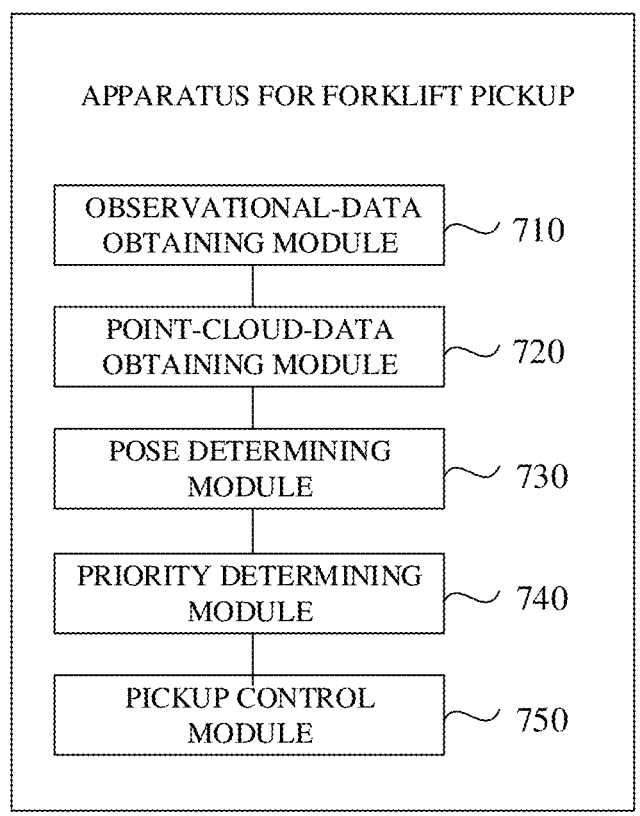
FIG. 7 is a structural block diagram illustrating an apparatus for forklift pickup in an implementation.

In an implementation, as illustrated in FIG. 7, an apparatus for forklift pickup is provided. The apparatus for forklift pickup includes an observational-data obtaining module 710, a point-cloud-data obtaining module 720, a pose determining module 730, a priority determining module 740, and a pickup control module 750.

The observational-data obtaining module 710 is configured to obtain observational data of a truck parking area by observing the truck parking area, where at least one truck is parked in the truck parking area, and each of the at least one truck is configured with at least one carrier.

The point-cloud-data obtaining module 720 is configured to obtain point cloud data of the at least one truck in the observational data, and obtain point cloud data of each of the at least one carrier in the point cloud data of the at least one truck.

The pose determining module 730 is configured to determine a relative pose of each of the at least one carrier based on the point cloud data of each of the at least one carrier.

The priority determining module 740 is configured to determine a pickup priority based on the point cloud data of each of the at least one carrier.

The pickup control module 750 is configured to control a forklift to perform pickup according to the relative pose of each of the at least one carrier and the pickup priority.

In an implementation, the observational-data obtaining module 710 is configured to obtain candidate data of at least one truck in the truck parking area collected by each of multiple monitoring devices, and obtain the observational data by fusing the candidate data collected by each of the multiple monitoring devices.

In an implementation, the apparatus for forklift pickup further includes a deploying module. The truck parking area is a rectangular area. The deploying module is configured to set monitoring points at two sides of long edges of the rectangular area. Monitoring devices are deployed at the monitoring points, and there is an overlap between observation intervals corresponding to adjacent monitoring points. The number of the monitoring points are obtained according to a length of a long edge of the rectangular area and an effective observation distance of each of the monitoring points. The effective observation distance is determined according to an observation distance of a target monitoring device. The observation distance of the target monitoring device is determined according to a vertical distance between the target monitoring device and the long edge of the rectangular area and a field angle of the target monitoring device, where the target monitoring device is a monitoring device with a minimum field angle in all the monitoring devices.

In an implementation, the multiple monitoring devices include 3D laser sensors and cameras.

In an implementation, the 3D laser sensors are used to collect candidate point cloud data of the at least one truck in the truck parking area, and the cameras are used to collect candidate image data of the at least one truck in the truck parking area. The observational-data obtaining module 710 is specifically configured to: obtain the candidate point cloud data of the at least one truck in the truck parking area collected by each of the 3D laser sensors; obtain the candidate image data of the at least one truck in the truck parking area collected by each of the cameras; and obtain the candidate data by fusing the candidate point cloud data and the candidate image data, where the candidate data is point cloud data with a color characteristic.

In an implementation, the apparatus for forklift pickup further includes a matching module. The point-cloud-data obtaining module 720 is configured to, for each of the at least one carrier, obtain a front-end cross-sectional point cloud cluster of the carrier by processing the point cloud data of the carrier. The matching module is configured to: slice in a direction perpendicular to a z axis the front-end cross-sectional point cloud cluster of the carrier into sliced layers, and perform clustering on point clouds of each of the sliced layers, where the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

In an implementation, the apparatus for forklift pickup further includes a filtering module. The filtering module is configured to obtain the front-end cross-sectional point cloud cluster of the carrier by performing density filtering and normal vector filtering on the point cloud data of the carrier. The density filtering is to rank number of point clouds according to distances between the point clouds and a monitoring point at an identical side in the y-axis direction, and maintain point clouds within a peak interval range, where the peak interval range refers to a distance range containing a target distance from the monitoring point, and a maximum number of point clouds are located at the target distance from the monitoring point. The normal vector filtering is to perform plane fitting on the point cloud data of the carrier, to obtain point cloud data satisfying a preset requirement.

In an implementation, the priority determining module 740 is configured to: for each type of goods, calculate a distance between a midpoint of each of the at least one carrier and a midpoint of an adjacent carrier, and subtract a length of a carrier in a preset template, to obtain a gap between two adjacent carriers; calculate a target gap corresponding to each of the at least one carrier according to the gap between the two adjacent carriers; and determine a pickup priority of a carrier with a maximum target gap as a highest pickup priority.

In an implementation, the priority determining module 740 is configured to determine a sum of a left gap of each of the at least one carrier and a right gap of each of the at least one carrier as the target gap corresponding to each of the at least one carrier.

In an implementation, the pickup control module 750 is configured to control a fork inserting direction of the forklift according to the relative pose of each of the at least one carrier, and control the forklift to perform pickup on goods carried by a corresponding carrier according to the pickup priority.

Each module in the above-mentioned apparatus for forklift pickup can be implemented in whole or in part by software, hardware, and combinations thereof. The above modules can be embedded in or independent of a processor in the computer device in the form of hardware, or stored in a memory in the computer device in the form of software, so that the processor can invoke and execute the operations corresponding to the above modules.

Figure 8:
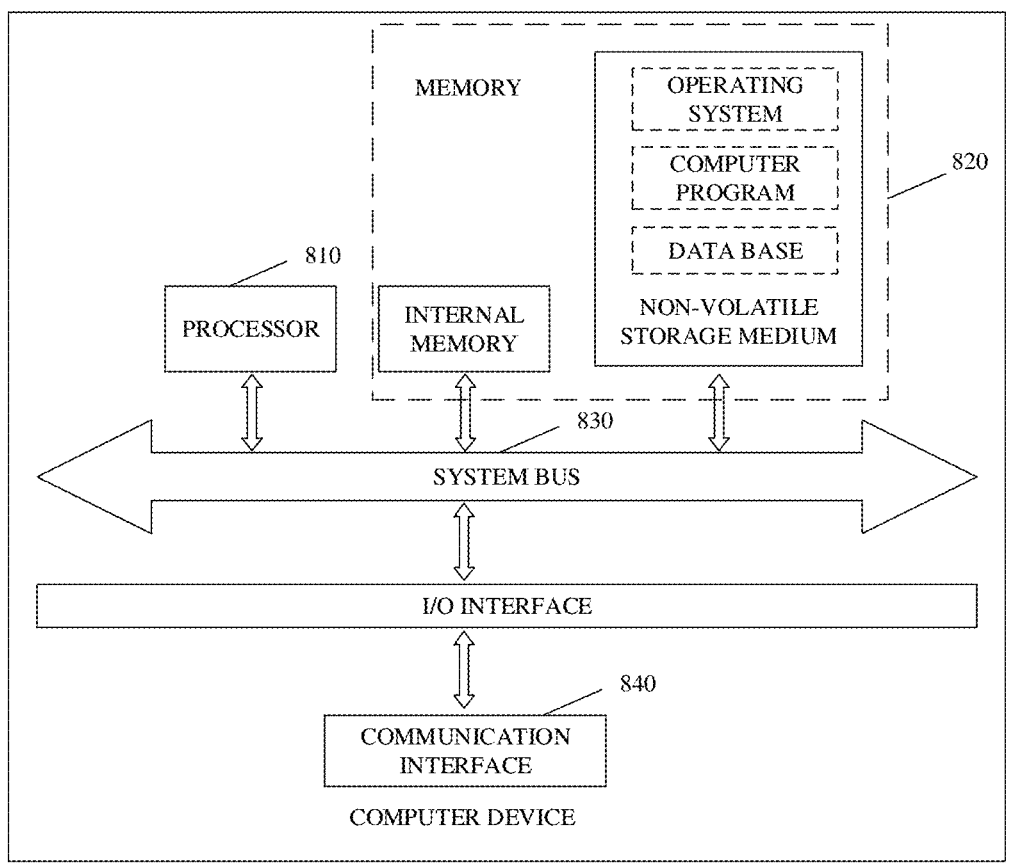
FIG. 8 is an internal structural diagram illustrating a computer device in an implementation.

In an implementation, a computer device is provided. The computer device may be a server, and an internal structural diagram thereof is illustrated in FIG. 8. The computer device includes a processor 810 coupled via a system bus 830, a memory 820, and a network interface 840. The processor of the computer device is configured to provide computing and control functions. The memory of the computer device includes a non-volatile storage medium or an internal memory. The non-volatile storage medium is configured to store an operating system, a computer program, and a data base. The internal memory is configured to provide an environment for running of the operating system and the computer program in the non-volatile storage medium. The data base of the computer device is configured to store goods data. The network interface of the computer device is configured to communicate with an external terminal through network connection. The computer program is executed by the processor to implement a method for forklift pickup.

Those of ordinary skill in the art can understand that the structure illustrated in FIG. 8 is only a block diagram of a part of the structure related to the solution of the present disclosure, and does not constitute a limitation on the computer device to which the solution of the present disclosure is applied. Include more or fewer components than illustrated in the figures, or combine certain components, or have a different arrangement of components.

In an implementation, a computer device is provided and includes a memory and a processor. The memory is configured to store computer programs. The processor is configured to execute the computer programs to: obtain observational data of a truck parking area by observing the truck parking area; obtain point cloud data of the at least one truck in the observational data, and obtain point cloud data of each of the at least one carrier in the point cloud data of the at least one truck; determine a relative pose of each of the at least one carrier based on the point cloud data of each of the at least one carrier; determine a pickup priority based on the point cloud data of each of the at least one carrier; and control a forklift to perform pickup according to the relative pose of each of the at least one carrier and the pickup priority.

In an implementation, the processor is configured to execute the computer programs to obtain candidate data of at least one truck in the truck parking area collected by each of multiple monitoring devices, and obtain the observational data by fusing the candidate data collected by each of the multiple monitoring devices.

In an implementation, the truck parking area is a rectangular area, and the processor is configured to execute the computer programs to set monitoring points at two sides of long edges of the rectangular area. Monitoring devices are deployed at the monitoring points, and there is an overlap between observation intervals corresponding to adjacent monitoring points. The number of the monitoring points are obtained according to a length of a long edge of the rectangular area and an effective observation distance of each of the monitoring points. The effective observation distance is determined according to an observation distance of a target monitoring device. The observation distance of the target monitoring device is determined according to a vertical distance between the target monitoring device and the long edge of the rectangular area and a field angle of the target monitoring device.

In an implementation, the multiple monitoring devices include 3D laser sensors and cameras.

In an implementation, the 3D laser sensors are used to collect candidate point cloud data of the at least one truck in the truck parking area, and the cameras are used to collect candidate image data of the at least one truck in the truck parking area. The processor is configured to execute the computer programs to obtain the candidate point cloud data of the at least one truck in the truck parking area collected by each of the 3D laser sensors; obtain the candidate image data of the at least one truck in the truck parking area collected by each of the cameras; and obtain the candidate data by fusing the candidate point cloud data and the candidate image data, where the candidate data is point cloud data with a color characteristic.

In an implementation, the processor is configured to execute the computer programs to: for each of the at least one carrier, obtain a front-end cross-sectional point cloud cluster of the carrier by processing the point cloud data of the carrier; slice in a direction perpendicular to a z axis the front-end cross-sectional point cloud cluster of the carrier into sliced layers, and perform clustering on point clouds of each of the sliced layers, where the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

In an implementation, the processor is configured to execute the computer programs to obtain the front-end cross-sectional point cloud cluster of the carrier by performing density filtering and normal vector filtering on the point cloud data of the carrier. The density filtering is to rank number of point clouds according to distances between the point clouds and a monitoring point at an identical side in the y-axis direction, and maintain point clouds within a peak interval range, where the peak interval range refers to a distance range containing a target distance from the monitoring point, and a maximum number of point clouds are located at the target distance from the monitoring point. The normal vector filtering is to perform plane fitting on the point cloud data of the carrier, to obtain point cloud data satisfying a preset requirement.

In an implementation, the processor is configured to execute the computer programs to: for each type of goods, calculate a distance between a midpoint of each of the at least one carrier and a midpoint of an adjacent carrier, and subtract a length of a carrier in a preset template, to obtain a gap between two adjacent carriers; calculate a target gap corresponding to each of the at least one carrier according to the gap between the two adjacent carriers; and determine a pickup priority of a carrier with a maximum target gap as a highest pickup priority.

In an implementation, the processor is configured to execute the computer programs to determine a sum of a left gap of each of the at least one carrier and a right gap of each of the at least one carrier as the target gap corresponding to each of the at least one carrier.

In an implementation, the processor is configured to execute the computer programs to control a fork inserting direction of the forklift according to the relative pose of each of the at least one carrier, and control the forklift to perform pickup on goods carried by a corresponding carrier according to the pickup priority.

In an implementation, a computer-readable storage medium is provided. The computer-readable storage medium is configured to store computer programs which when executed by a processor, enable the processor to: obtain observational data of a truck parking area by observing the truck parking area, where at least one truck is parked in the truck parking area, and each of the at least one truck is configured with at least one carrier; obtain point cloud data of the at least one truck in the observational data, and obtain point cloud data of each of the at least one carrier in the point cloud data of the at least one truck; determine a relative pose of each of the at least one carrier based on the point cloud data of each of the at least one carrier; determine a pickup priority based on the point cloud data of each of the at least one carrier; and control a forklift to perform pickup according to the relative pose of each of the at least one carrier and the pickup priority.

In an implementation, the processor configured to obtaining the observational data of the truck parking area by observing the truck parking area is configured to execute the computer programs to obtain candidate data of at least one truck in the truck parking area collected by each of multiple monitoring devices, and obtain the observational data by fusing the candidate data collected by each of the multiple monitoring devices.

In an implementation, the truck parking area is a rectangular area, and monitoring points are set at two sides of long edges of the rectangular area. Monitoring devices are deployed at the monitoring points, and there is an overlap between observation intervals corresponding to adjacent monitoring points. The number of the monitoring points are obtained according to a length of a long edge of the rectangular area and an effective observation distance of each of the monitoring points. The effective observation distance is determined according to an observation distance of a target monitoring device. The observation distance of the target monitoring device is determined according to a vertical distance between the target monitoring device and the long edge of the rectangular area and a field angle of the target monitoring device, where the target monitoring device is a monitoring device with a minimum field angle in all the monitoring devices.

In an implementation, the multiple monitoring devices include 3D laser sensors and cameras.

In an implementation, the 3D laser sensors are used to collect candidate point cloud data of the at least one truck in the truck parking area, and the cameras are used to collect candidate image data of the at least one truck in the truck parking area. The processor configured to obtain the candidate data of the at least one truck in the truck parking area collected by each of the multiple monitoring devices is configured to execute the computer programs to: obtain the candidate point cloud data of the at least one truck in the truck parking area collected by each of the 3D laser sensors; obtain the candidate image data of the at least one truck in the truck parking area collected by each of the cameras; and obtain the candidate data by fusing the candidate point cloud data and the candidate image data, where the candidate data is point cloud data with a color characteristic.

In an implementation, the processor configured to determine the relative pose of each of the at least one carrier based on the point cloud data of each of the at least one carrier is configured to execute the computer programs to: for each of the at least one carrier, obtain a front-end cross-sectional point cloud cluster of the carrier by processing the point cloud data of the carrier; slice in a direction perpendicular to a z axis the front-end cross-sectional point cloud cluster of the carrier into sliced layers, and perform clustering on point clouds of each of the sliced layers, where the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

In an implementation, the processor configured to obtain the front-end cross-sectional point cloud cluster of the carrier by processing the point cloud data of the carrier is configured to execute the computer programs to obtain the front-end cross-sectional point cloud cluster of the carrier by performing density filtering and normal vector filtering on the point cloud data of the carrier. The density filtering is to rank number of point clouds according to distances between the point clouds and a monitoring point at an identical side in the y-axis direction, and maintain point clouds within a peak interval range, where the peak interval range refers to a distance range containing a target distance from the monitoring point, and a maximum number of point clouds are located at the target distance from the monitoring point. The normal vector filtering is to perform plane fitting on the point cloud data of the carrier, to obtain point cloud data satisfying a preset requirement.

In an implementations, the processor configured to determine the pickup priority based on the point cloud data of each of the at least one carrier is configured to execute the computer programs to: for each type of goods, calculate a distance between a midpoint of each of the at least one carrier and a midpoint of an adjacent carrier, and subtract a length of a carrier in a preset template, to obtain a gap between two adjacent carriers; calculate a target gap corresponding to each of the at least one carrier according to the gap between the two adjacent carriers; and determine a pickup priority of a carrier with a maximum target gap as a highest pickup priority.

In an implementation, the processor configured to calculate the target gap corresponding to each of the at least one carrier according to the gap between the two adjacent carriers is configured to execute the computer programs to determine a sum of a left gap of each of the at least one carrier and a right gap of each of the at least one carrier as the target gap corresponding to each of the at least one carrier.

In an implementation, the processor configured to control the forklift to perform pickup according to the relative pose of each of the at least one carrier and the pickup priority is configured to execute the computer programs to control a fork inserting direction of the forklift according to the relative pose of each of the at least one carrier, and control the forklift to perform pickup on goods carried by a corresponding carrier according to the pickup priority.

In an implementation, a computer program product is provided. The computer program product includes computer programs which when executed by a processor, enable the processor to: obtain observational data of a truck parking area by observing the truck parking area, where at least one truck is parked in the truck parking area, and each of the at least one truck is configured with at least one carrier; obtain point cloud data of the at least one truck in the observational data, and obtain point cloud data of each of the at least one carrier in the point cloud data of the at least one truck; determine a relative pose of each of the at least one carrier based on the point cloud data of each of the at least one carrier; determine a pickup priority based on the point cloud data of each of the at least one carrier; and control a forklift to perform pickup according to the relative pose of each of the at least one carrier and the pickup priority.

In an implementation, the processor configured to obtaining the observational data of the truck parking area by observing the truck parking area is configured to execute the computer programs to obtain candidate data of at least one truck in the truck parking area collected by each of multiple monitoring devices, and obtain the observational data by fusing the candidate data collected by each of the multiple monitoring devices.

In an implementation, the truck parking area is a rectangular area, and monitoring points are set at two sides of long edges of the rectangular area. Monitoring devices are deployed at the monitoring points, and there is an overlap between observation intervals corresponding to adjacent monitoring points. The number of the monitoring points are obtained according to a length of a long edge of the rectangular area and an effective observation distance of each of the monitoring points. The effective observation distance is determined according to an observation distance of a target monitoring device. The observation distance of the target monitoring device is determined according to a vertical distance between the target monitoring device and the long edge of the rectangular area and a field angle of the target monitoring device.

In an implementation, the multiple monitoring devices include 3D laser sensors and cameras.

In an implementation, the 3D laser sensors are used to collect candidate point cloud data of the at least one truck in the truck parking area, and the cameras are used to collect candidate image data of the at least one truck in the truck parking area. The processor configured to obtain the candidate data of the at least one truck in the truck parking area collected by each of the multiple monitoring devices is configured to execute the computer programs to: obtain the candidate point cloud data of the at least one truck in the truck parking area collected by each of the 3D laser sensors; obtain the candidate image data of the at least one truck in the truck parking area collected by each of the cameras; and obtain the candidate data by fusing the candidate point cloud data and the candidate image data, where the candidate data is point cloud data with a color characteristic.

In an implementation, the processor configured to determine the relative pose of each of the at least one carrier based on the point cloud data of each of the at least one carrier is configured to execute the computer programs to: for each of the at least one carrier, obtain a front-end cross-sectional point cloud cluster of the carrier by processing the point cloud data of the carrier; slice in a direction perpendicular to a z axis the front-end cross-sectional point cloud cluster of the carrier into sliced layers, and perform clustering on point clouds of each of the sliced layers, where the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

In an implementation, the processor configured to obtain the front-end cross-sectional point cloud cluster of the carrier by processing the point cloud data of the carrier is configured to execute the computer programs to obtain the front-end cross-sectional point cloud cluster of the carrier by performing density filtering and normal vector filtering on the point cloud data of the carrier. The density filtering is to rank number of point clouds according to distances between the point clouds and a monitoring point at an identical side in the y-axis direction, and maintain point clouds within a peak interval range, where the peak interval range refers to a distance range containing a target distance from the monitoring point, and a maximum number of point clouds are located at the target distance from the monitoring point. The normal vector filtering is to perform plane fitting on the point cloud data of the carrier, to obtain point cloud data satisfying a preset requirement.

In an implementations, the processor configured to determine the pickup priority based on the point cloud data of each of the at least one carrier is configured to execute the computer programs to: for each type of goods, calculate a distance between a midpoint of each of the at least one carrier and a midpoint of an adjacent carrier, and subtract a length of a carrier in a preset template, to obtain a gap between two adjacent carriers; calculate a target gap corresponding to each of the at least one carrier according to the gap between the two adjacent carriers; and determine a pickup priority of a carrier with a maximum target gap as a highest pickup priority.

In an implementation, the processor configured to calculate the target gap corresponding to each of the at least one carrier according to the gap between the two adjacent carriers is configured to execute the computer programs to determine a sum of a left gap of each of the at least one carrier and a right gap of each of the at least one carrier as the target gap corresponding to each of the at least one carrier.

In an implementation, the processor configured to control the forklift to perform pickup according to the relative pose of each of the at least one carrier and the pickup priority is configured to execute the computer programs to control a fork inserting direction of the forklift according to the relative pose of each of the at least one carrier, and control the forklift to perform pickup on goods carried by a corresponding carrier according to the pickup priority.

It should be noted that the user information (including but not limited to user equipment information, user personal information, etc.) and data (including but not limited to data for analysis, stored data, displayed data, etc.) involved in the disclosure are all information and data authorized by users or fully authorized by all parties.

It will be understood by those of ordinary skill in the art that all or a part of the various methods of the implementations described above may be accomplished by means of computer programs to instruct associated hardware, where the computer programs may be stored in a non-volatile computer-readable storage medium, and when the computer programs are executed, the operations of the implementations of the above methods can be included. Any reference to memory, database or other media used in the implementations provided in the disclosure can include at least one of a non-volatile memory or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include an RAM, an external cache, etc. By way of example but not limitation, the RAM may have many forms, such as a static random access memory (SRAM), a dynamic random access memory (DRAM), etc. The databases involved in the implementations provided in the disclosure may include at least one of relational databases or non-relational databases. The non-relational databases may include block-chain-based distributed databases, etc., which are not limited herein. The processor involved in the implementations provided in the disclosure can be a general-purpose processor, a central processing unit, a graphics processor, a digital signal processor, a programmable logic device, a data processing logic device based on quantum computing, etc., which is not limited herein.

The technical features of the above implementations can be arbitrarily combined. To make illustration concise, all possible combinations of the technical features in the above implementations are not described. However, as long as there is no contradiction between the combinations of these technical features, they should be considered as the scope of the disclosure.

The above-mentioned implementations only express several implementations of the disclosure, and their illustration are more specific and detailed, but they should not be construed as limiting the patent scope of the disclosure. It should be pointed out that for those of ordinary skill in the art, without departing from the concept of the disclosure, several modifications and improvements can be made, all of which are within the scope of protection of the disclosure. Therefore, the scope of protection of the disclosure should be based on the appended claims.

What is claimed is:

1. A method for forklift pickup, comprising:
   obtaining observational data of a truck parking area by observing the truck parking area, at least one truck being parked in the truck parking area, each of the at least one truck being configured with at least one carrier;
   obtaining point cloud data of the at least one truck in the observational data, and obtaining point cloud data of each of the at least one carrier in the point cloud data of the at least one truck;

determining a relative pose of each of the at least one carrier based on the point cloud data of each of the at least one carrier;

determining a pickup priority based on the point cloud data of each of the at least one carrier; and controlling a forklift to perform pickup according to the relative pose of each of the at least one carrier and the pickup priority.

2. The method of claim 1, wherein obtaining the observational data of the truck parking area by observing the truck parking area comprises:

obtaining candidate data of at least one truck in the truck parking area collected by each of a plurality of monitoring devices; and obtaining the observational data by fusing the candidate data collected by each of the plurality of monitoring devices.

3. The method of claim 2, wherein:

the plurality of monitoring devices comprise three-dimensional (3D) laser sensors and cameras, wherein the 3D laser sensors are used to collect candidate point cloud data of the at least one truck in the truck parking area, and the cameras are used to collect candidate image data of the at least one truck in the truck parking area; and obtaining the candidate data of the at least one truck in the truck parking area collected by each of the plurality of monitoring devices comprises:

obtaining the candidate point cloud data of the at least one truck in the truck parking area collected by each of the 3D laser sensors;

obtaining the candidate image data of the at least one truck in the truck parking area collected by each of the cameras; and obtaining the candidate data by fusing the candidate point cloud data and the candidate image data, wherein the candidate data is point cloud data with a color characteristic.

4. The method of claim 1, wherein:

the truck parking area is a rectangular area, monitoring points are set at two sides of long edges of the rectangular area, and monitoring devices are deployed at the monitoring points;

number of the monitoring points are obtained according to a length of a long edge of the rectangular area and an effective observation distance of each of the monitoring points;

the effective observation distance is determined according to an observation distance of a target monitoring device; and the observation distance of the target monitoring device is determined according to a vertical distance between the target monitoring device and the long edge of the rectangular area and a field angle of the target monitoring device, wherein the target monitoring device is a monitoring device with a minimum field angle in all the monitoring devices.

5. The method of claim 1, wherein determining the relative pose of each of the at least one carrier based on the point cloud data of each of the at least one carrier comprises:

for each of the at least one carrier, obtaining a front-end cross-sectional point cloud cluster of the carrier by processing the point cloud data of the carrier;

slicing in a direction perpendicular to a z axis the front-end cross-sectional point cloud cluster of the carrier into sliced layers, and performing clustering on point clouds of each of the sliced layers, wherein the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and matching clustering results with supporting foot information of a carrier in a preset template, and eliminating a sliced layer not satisfying a matching requirement, to obtain a pose of the carrier.

6. The method of claim 5, wherein obtaining the front-end cross-sectional point cloud cluster of the carrier by processing the point cloud data of the carrier comprises:

obtaining the front-end cross-sectional point cloud cluster of the carrier by performing density filtering and normal vector filtering on the point cloud data of the carrier, wherein the density filtering is to rank number of point clouds according to distances between the point clouds and a monitoring point at an identical side in the y-axis direction, and maintain point clouds within a peak interval range, wherein the peak interval range refers to a distance range containing a target distance from the monitoring point, and a maximum number of point clouds are located at the target distance from the monitoring point; and the normal vector filtering is to perform plane fitting on the point cloud data of the carrier, to obtain point cloud data satisfying a preset requirement.

7. The method of claim 1, wherein determining the pickup priority based on the point cloud data of each of the at least one carrier comprises:

for each type of goods, calculating a distance between a midpoint of each of the at least one carrier and a midpoint of an adjacent carrier, and subtracting a length of a carrier in a preset template, to obtain a gap between two adjacent carriers;

calculating a target gap corresponding to each of the at least one carrier according to the gap between the two adjacent carriers; and determining a pickup priority of a carrier with a maximum target gap as a highest pickup priority.

8. The method of claim 7, wherein calculating the target gap corresponding to each of the at least one carrier according to the gap between the two adjacent carriers comprises:

determining a sum of a left gap of each of the at least one carrier and a right gap of each of the at least one carrier as the target gap corresponding to each of the at least one carrier.

9. The method of claim 1, wherein controlling the forklift to perform pickup according to the relative pose of each of the at least one carrier and the pickup priority comprises:

controlling a fork inserting direction of the forklift according to the relative pose of each of the at least one carrier; and controlling the forklift to perform pickup on goods carried by a corresponding carrier according to the pickup priority.

10. A computer device, comprising:

a processor; and a memory configured to store computer programs, wherein the processor is configured to execute the computer programs to:

obtain observational data of a truck parking area by observing the truck parking area, at least one truck being parked in the truck parking area, each of the at least one truck being configured with at least one carrier;

obtain point cloud data of the at least one truck in the observational data, and obtain point cloud data of each of the at least one carrier in the point cloud data of the at least one truck;

determine a relative pose of each of the at least one carrier based on the point cloud data of each of the at least one carrier;

determine a pickup priority based on the point cloud data of each of the at least one carrier; and control a forklift to perform pickup according to the relative pose of each of the at least one carrier and the pickup priority.

11. The computer device of claim 10, wherein the processor configured to obtain the observational data of the truck parking area by observing the truck parking area is configured to execute the computer programs to:

obtain candidate data of at least one truck in the truck parking area collected by each of a plurality of monitoring devices; and obtain the observational data by fusing the candidate data collected by each of the plurality of monitoring devices.

12. The computer device of claim 11, wherein:

the truck parking area is a rectangular area, monitoring points are set at two sides of long edges of the rectangular area, and monitoring devices are deployed at the monitoring points;

number of the monitoring points are obtained according to a length of a long edge of the rectangular area and an effective observation distance of each of the monitoring points;

the effective observation distance is determined according to an observation distance of a target monitoring device; and the observation distance of the target monitoring device is determined according to a vertical distance between the target monitoring device and the long edge of the rectangular area and a field angle of the target monitoring device, wherein the target monitoring device is a monitoring device with a minimum field angle in all the monitoring devices.

13. The computer device of claim 11, wherein:

the plurality of monitoring devices comprise three-dimensional (3D) laser sensors and cameras, wherein the 3D laser sensors are used to collect candidate point cloud data of the at least one truck in the truck parking area, and the cameras are used to collect candidate image data of the at least one truck in the truck parking area; and obtain the candidate data of the at least one truck in the truck parking area collected by each of the plurality of monitoring devices comprises:

obtaining the candidate point cloud data of the at least one truck in the truck parking area collected by each of the 3D laser sensors;

obtaining the candidate image data of the at least one truck in the truck parking area collected by each of the cameras; and obtaining the candidate data by fusing the candidate point cloud data and the candidate image data, wherein the candidate data is point cloud data with a color characteristic.

14. The computer device of claim 10, wherein the processor configured to determine the relative pose of each of the at least one carrier based on the point cloud data of each of the at least one carrier is configured to execute the computer programs to:

for each of the at least one carrier, obtain a front-end cross-sectional point cloud cluster of the carrier by processing the point cloud data of the carrier;

slice in a direction perpendicular to a z axis the front-end cross-sectional point cloud cluster of the carrier into sliced layers, and perform clustering on point clouds of each of the sliced layers, wherein the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

15. The computer device of claim 14, wherein the processor configured to obtain the front-end cross-sectional point cloud cluster of the carrier by processing the point cloud data of the carrier is configured to execute the computer programs to:

obtain the front-end cross-sectional point cloud cluster of the carrier by performing density filtering and normal vector filtering on the point cloud data of the carrier, wherein the density filtering is to rank number of point clouds according to distances between the point clouds and a monitoring point at an identical side in the y-axis direction, and maintain point clouds within a peak interval range, wherein the peak interval range refers to a distance range containing a target distance from the monitoring point, and a maximum number of point clouds are located at the target distance from the monitoring point; and the normal vector filtering is to perform plane fitting on the point cloud data of the carrier, to obtain point cloud data satisfying a preset requirement.

16. The computer device of claim 10, wherein the processor configured to determine the pickup priority based on the point cloud data of each of the at least one carrier is configured to execute the computer programs to:

for each type of goods, calculate a distance between a midpoint of each of the at least one carrier and a midpoint of an adjacent carrier, and subtract a length of a carrier in a preset template, to obtain a gap between two adjacent carriers;

calculate a target gap corresponding to each of the at least one carrier according to the gap between the two adjacent carriers; and determine a pickup priority of a carrier with a maximum target gap as a highest pickup priority.

17. A non-volatile computer-readable storage medium configured to store computer programs which, when executed by a processor, enable the processor to:

obtain observational data of a truck parking area by observing the truck parking area, at least one truck being parked in the truck parking area, each of the at least one truck being configured with at least one carrier;

obtain point cloud data of the at least one truck in the observational data, and obtain point cloud data of each of the at least one carrier in the point cloud data of the at least one truck;

determine a relative pose of each of the at least one carrier based on the point cloud data of each of the at least one carrier;

determine a pickup priority based on the point cloud data of each of the at least one carrier; and control a forklift to perform pickup according to the relative pose of each of the at least one carrier and the pickup priority.

18. The storage medium of claim 17, wherein the processor configured to obtain the observational data of the truck parking area by observing the truck parking area is configured to execute the computer programs to:

obtain candidate data of at least one truck in the truck parking area collected by each of a plurality of monitoring devices; and obtain the observational data by fusing the candidate data collected by each of the plurality of monitoring devices.

19. The storage medium of claim 17, wherein the processor configured to determine the relative pose of each of the at least one carrier based on the point cloud data of each of the at least one carrier is configured to execute the computer programs to:

for each of the at least one carrier, obtain a front-end cross-sectional point cloud cluster of the carrier by processing the point cloud data of the carrier;

slice in a direction perpendicular to a z axis the front-end cross-sectional point cloud cluster of the carrier into sliced layers, and perform clustering on point clouds of each of the sliced layers, wherein the truck parking area is a rectangular area, a direction of a long edge of the truck parking area is assigned as an x-axis direction, a direction of a short edge of the truck parking area is assigned as a y-axis direction, and a direction perpendicular to an xy plane is assigned as a z-axis direction; and match clustering results with supporting foot information of a carrier in a preset template, and eliminate a sliced layer not satisfying a matching requirement, to obtain a pose of the carrier.

20. The storage medium of claim 17, wherein the processor configured to determine the pickup priority based on the point cloud data of each of the at least one carrier is configured to execute the computer programs to:

for each type of goods, calculate a distance between a midpoint of each of the at least one carrier and a midpoint of an adjacent carrier, and subtract a length of a carrier in a preset template, to obtain a gap between two adjacent carriers;

calculate a target gap corresponding to each of the at least one carrier according to the gap between the two adjacent carriers; and determine a pickup priority of a carrier with a maximum target gap as a highest pickup priority.

* * * * *